(12) United States Patent
Huang et al.

(10) Patent No.: US 10,341,840 B2
(45) Date of Patent: Jul. 2, 2019

(54) INFORMATION PROCESSING METHOD, COMMUNICATION NODE AND COMPUTER STORAGE MEDIUM

(71) Applicant: ZTE Corporation, Shenzhen (CN)

(72) Inventors: Ying Huang, Shenzhen (CN); Lin Chen, Shenzhen (CN)

(73) Assignee: ZTE Corporation, Shenzhen, Guangdon (CN)

( * ) Notice: Subject to any disclaimer, the term of this patent is extended or adjusted under 35 U.S.C. 154(b) by 0 days.

(21) Appl. No.: 15/564,775

(22) PCT Filed: Aug. 21, 2015

(86) PCT No.: PCT/CN2015/087754
§ 371 (c)(1),
(2) Date: Nov. 7, 2017

(87) PCT Pub. No.: WO2016/161745
PCT Pub. Date: Oct. 13, 2016

(65) Prior Publication Data
US 2018/0109985 A1    Apr. 19, 2018

(30) Foreign Application Priority Data
Apr. 10, 2015 (CN) .......................... 2015 1 0169312

(51) Int. Cl.
*H04W 36/00* (2009.01)
*H04W 36/32* (2009.01)
(Continued)

(52) U.S. Cl.
CPC .............. *H04W 8/005* (2013.01); *H04W 4/90* (2018.02); *H04W 24/10* (2013.01); *H04W 36/00* (2013.01);
(Continued)

(58) Field of Classification Search
CPC . H04W 76/23; H04W 36/0094; H04W 36/30; H04W 36/00; H04W 36/32;
(Continued)

(56) References Cited

U.S. PATENT DOCUMENTS

2009/0196213 A1* 8/2009 Zhong ................... H04W 36/06
370/312
2013/0315079 A1 11/2013 Edge
(Continued)

FOREIGN PATENT DOCUMENTS

CN        102215537 A    10/2011
CN        103179575 A    6/2013
(Continued)

OTHER PUBLICATIONS

International Search Report in international application No. PCT/CN2015/087754, dated Dec. 31, 2015, 2 pgs.
(Continued)

*Primary Examiner* — Brian D Nguyen
(74) *Attorney, Agent, or Firm* — Cooper Legal Group, LLC

(57) ABSTRACT

An information processing method and a communication node are disclosed. The method configured in a first Device-to-Device (D2D) User Equipment (UE) includes: receiving bearer control information sent by a first evolved Node B (eNB); and changing to a second access node according to the bearer control information for communication data transmission, wherein the first eNB is a first access node or the second access node, and the second access node is the first eNB or a D2D relay node. Also disclosed is a computer storage medium.

17 Claims, 9 Drawing Sheets

(51) Int. Cl.
| | |
|---|---|
| H04W 36/30 | (2009.01) |
| H04W 8/00 | (2009.01) |
| H04W 76/20 | (2018.01) |
| H04W 76/23 | (2018.01) |
| H04W 4/90 | (2018.01) |
| H04W 76/14 | (2018.01) |
| H04W 76/30 | (2018.01) |
| H04W 24/10 | (2009.01) |
| H04W 88/04 | (2009.01) |

(52) U.S. Cl.
CPC ... *H04W 36/0005* (2013.01); *H04W 36/0055* (2013.01); *H04W 36/0094* (2013.01); *H04W 36/30* (2013.01); *H04W 36/32* (2013.01); *H04W 76/14* (2018.02); *H04W 76/20* (2018.02); *H04W 76/23* (2018.02); *H04W 76/30* (2018.02); *H04W 36/03* (2018.08); *H04W 88/04* (2013.01)

(58) Field of Classification Search
CPC ... H04W 76/20; H04W 36/0005; H04W 4/90; H04W 76/14; H04W 88/04; Y02D 70/20
See application file for complete search history.

(56) References Cited

U.S. PATENT DOCUMENTS

| | | | |
|---|---|---|---|
| 2013/0316727 A1 | 11/2013 | Edge | |
| 2014/0328310 A1 | 11/2014 | Xu | |
| 2015/0124748 A1* | 5/2015 | Park | H04L 5/0032 370/329 |
| 2015/0215764 A1* | 7/2015 | Tavildar | H04W 48/08 370/254 |
| 2015/0271859 A1* | 9/2015 | Huang | H04W 72/12 370/329 |
| 2015/0304896 A1* | 10/2015 | Turtinen | H04W 76/14 370/331 |
| 2015/0358838 A1* | 12/2015 | Wei | H04W 76/15 370/228 |
| 2015/0365994 A1* | 12/2015 | Yu | H04W 72/1268 370/336 |
| 2016/0100345 A1* | 4/2016 | Thangarasa | H04L 5/00 370/332 |
| 2016/0100355 A1 | 4/2016 | Chen et al. | |
| 2016/0127963 A1* | 5/2016 | Masini | H04W 12/08 370/331 |
| 2016/0150426 A1 | 5/2016 | Panaitopol | |
| 2016/0192399 A1* | 6/2016 | Zhu | H04W 36/0022 370/331 |
| 2016/0227518 A1* | 8/2016 | Li | H04W 72/042 |
| 2017/0094495 A1* | 3/2017 | Ke | H04W 76/14 |
| 2018/0192451 A9* | 7/2018 | Kim | H04L 47/34 |

FOREIGN PATENT DOCUMENTS

| | | |
|---|---|---|
| CN | 103686908 A | 3/2014 |
| CN | 104335666 A | 2/2015 |
| WO | 2014180283 A1 | 11/2014 |
| WO | 2015004142 A1 | 1/2015 |
| WO | 2015020231 A1 | 2/2015 |
| WO | 2016153774 A1 | 9/2016 |

OTHER PUBLICATIONS

English Translation of the Written Opinion of the International Search Authority in international application No. PCT/CN2015/087754, dated Dec. 31, 2015, 6 pgs.

Supplementary European Search Report in European application No. 15888299.3, dated Mar. 15, 2018, 9 pgs.

"Report of 3GPP TSG RAN WG2 meeting #90 held in Fukuoka, Japan, May 25-29, 2015", Source: ETSI Mobile Competence Centre, 3GPP TSG-RAN Working Group 2 meeting #91, Aug. 2015, R2-153060, 147 pgs.

"3rd Generation Partnership Project;Technical Specification Group Radio Access Network; Evolved Universal Terrestrial Radio Access (E-UTRA); Radio Resource Control (RRC); Protocol specification (Release 13)", 3GPP TS 36.331, V13.1.0, Mar. 2016, 551 pgs.

"Draft Report of 3GPP TSG RAN WG2 meeting #92 held in Anaheim, USA, Nov. 16-20, 2015", 3GPP TSG-RAN Working Group 2 Meeting #93, Feb. 2016, 246 pgs.

"3GPP SA WG2 Meeting S2#98 S2-132559", "E-UTRAN based discovery of ProSe Relays", Jul. 19, 2013 (Jul. 19, 2013), 4 pgs.

* cited by examiner

US 10,341,840 B2

INFORMATION PROCESSING METHOD, COMMUNICATION NODE AND COMPUTER STORAGE MEDIUM

TECHNICAL FIELD

The disclosure relates to the field of communications, and in particular to an information processing method, a communication node, and a computer storage medium.

BACKGROUND

With the development of wireless multimedia services, demands of people for high data rate and user experience are increasing, so as to present higher requirements for system capacity and coverage of a traditional cellular network. In addition, the popularization of applications such as social networking, near field data sharing and local advertising enable demands of people, for knowing people or things of interest nearby and communicating therewith, to gradually increase. A conventional cell-based cellular network has obvious limitations in high data rate and supporting of proximity services. Under this demand background, a Device-to-Device (D2D) technology, which is representative of a new development direction of future communication technologies, emerges. Application of the D2D technology can alleviate burdens on the cellular network, reduce the power consumption of a battery of a User Equipment (UE), increase the data rate, improve the robustness of network infrastructure, and well meet requirements for the foregoing high data rate services and proximity services.

The D2D technology can work at a licensed band or an unlicensed band to allow multiple UEs (i.e., D2D UEs) supporting D2D functions to perform direct discovery/direct communication in the presence of network infrastructure or in the absence of network infrastructure. There are mainly three D2D application scenarios as follows.

1) UE1 and UE2 perform data interaction under the coverage of a cellular network, and user plane data does not pass through network infrastructure, as shown in Mode 1 of FIG. 1.

2) UE in a weakly covering/coverless area performs relayed transmission, as shown in Mode 2 of FIG. 1. UE4 with poor signal quality is allowed to communicate with a network via proximal UE3 covered by the network, and coverage expansion and capacity improvement of an operator can be assisted.

3) When an earthquake or an emergency occurs and a cellular network cannot normally work, inter-device direct communication is allowed, as shown in Mode 3 of FIG. 1. Control planes and user planes among UE5, UE6 and UE7 perform one-hop or multi-hop data communication without network infrastructure. The D2D technology usually includes a D2D discovery technology and a D2D communication technology.

1) The D2D discovery technology refers to a technology for judging/determining whether two or more D2D UEs are proximal to each other (e.g., within a range capable of performing D2D direct communication) or judging/determining whether a first UE is proximal to a second UE.

2) The D2D communication technology refers to a technology for direct communication of some or all communication data between D2D UEs without network infrastructure.

In application scenarios as shown in FIG. 2 and FIG. 3, a D2D UE may serve as a relay node, such that a remote D2D UE at the coverage edge of a cellular network or out of coverage can perform cellular communication with a network through a relay node UE, and the D2D UE performs D2D communication through the relay node UE. The D2D UE probably moves at the coverage edge of a cellular cell, and in this case, the D2D UE needs to change an access node thereof for accessing the network. For example, after moving into the cell coverage area, the D2D UE relayed by the relay UE can access the network through an evolved Node B (eNB), and for a UE within the cell coverage area which accesses the network through the eNB, the UE can access the network only through the relay UE after moving out of the cell coverage area. A method for changing an access node of a D2D UE is not provided in the conventional art, thus influencing the continuity of communication services of UEs at the coverage edge of a cell.

SUMMARY

In view of this, the embodiments of the disclosure are intended to provide an information processing method and a communication node, used to at least partially solve the problem in the conventional art of node change of a D2D UE.

The technical solutions of the embodiments of the disclosure are implemented as follows.

According to a first aspect of the embodiments of the disclosure, an information processing method is provided. The method includes:

receiving bearer control information sent by a first eNB; and changing to a second access node according to the bearer control information for communication data transmission, wherein the first eNB is a first access node or the second access node, and the second access node is the first eNB or a D2D relay node.

Alternatively, the bearer control information includes a bearer change indicator or bearer handover decision parameter information, wherein the bearer change indicator is used to indicate change of first D2D UE to the second access node for communication data transmission; and the bearer handover decision parameter information is used for the first D2D UE to determine whether to be changeable to the second access node for communication data transmission.

Alternatively, the bearer handover decision parameter information includes at least one of a Radio Resource Management (RRM) measurement threshold value of the first D2D UE for a serving cell and/or a neighbor cell, and measurement threshold values of signals sent by a first relay node and a second relay node, wherein the second relay node is a relay node distant from the first relay node within a specified range; and the first relay node is a D2D relay node connected to the first D2D UE, and the second relay node is a D2D relay node not connected to the first D2D UE.

Alternatively, the method further includes:

measuring at least one of a serving cell, a neighbor cell, a first relay node and a second relay node to form a measurement result, wherein the second relay node is a relay node distant from the first relay node within a specified range; and the first relay node is a D2D relay node connected to the first D2D UE, and the second relay node is a D2D relay node not connected to the first D2D UE; and comparing the measurement result with the bearer handover decision parameter information to determine whether to be changeable to the second access node for communication data transmission.

Alternatively, the method further includes:

before changing to a second access node according to the bearer control information for communication data transmission, the method further includes:

sending bearer handover decision auxiliary information to the first eNB, wherein the first eNB is the first access node or the second access node.

Alternatively, the bearer handover decision auxiliary information further includes at least one of the following:

UE to Network (UE to NW) relay indication information, a measurement report, and location information, wherein the UE to NW relay indication information is used to indicate current data transmission of the first D2D UE through a UE to NW relay;

the measurement report contains an RRM measurement result of the first D2D UE for a current serving cell and/or neighbor cell and/or a measurement result of the UE for signals sent by a first relay node and a second relay node; the second relay node is a relay node distant from the first relay node within a specified range; the first relay node is a D2D relay node connected to the first D2D UE, and the second relay node is a D2D relay node not connected to the first D2D UE; and the location information includes current geographical location information of the first D2D UE.

Alternatively, the method further includes:

before the first D2D UE sends a measurement report to the first eNB, receiving measurement reporting configuration information sent by the first eNB;

performing measurement according to the measurement reporting configuration information to form the measurement result; and when the measurement result satisfies a reporting condition, sending the measurement report to the first eNB.

According to a second aspect of the embodiments of the disclosure, an information processing method is provided. The method includes:

forming bearer control information; and sending the bearer control information to first D2D UE, wherein the bearer control information is used to change the first D2D UE to a second access node for communication data transmission;

a first eNB is a first access node or the second access node; and the second access node is the first eNB or a D2D relay node.

Alternatively, the bearer control information includes a bearer change indicator or bearer handover decision parameter information, wherein the bearer change indicator is used to indicate change of the first D2D UE to the second access node for communication data transmission; and the bearer handover decision parameter information is used for the first D2D UE to determine whether to be changeable to the second access node for communication data transmission.

Alternatively, the bearer handover decision parameter information includes at least one of RRM measurement threshold values of the first D2D UE for a serving cell and/or a neighbor cell, and measurement threshold values of the first D2D UE for signals sent by a second relay node.

Alternatively, the method further includes:

receiving bearer handover decision auxiliary information sent by the first D2D UE, wherein forming bearer control information includes:

forming the bearer control information according to the bearer handover decision auxiliary information.

Alternatively, the bearer handover decision auxiliary information further includes at least one of the following:

UE to NW relay indication information, a measurement report, and location information, wherein the UE to NW relay indication information is used to indicate current data transmission of the first D2D UE through a UE to NW relay;

the measurement report contains an RRM measurement result of the first D2D UE for a current serving cell and/or neighbor cell and/or a measurement result of the UE for signals sent by a first access node and/or a first relay node and/or a second relay node; the second relay node is a relay node distant from the first relay node within a specified range; the first relay node is a D2D relay node connected to the first D2D UE, and the second relay node is a D2D relay node not connected to the first D2D UE; and the location information includes current geographical location information of the first D2D UE.

According to a third aspect of the embodiments of the disclosure, a communication node is provided. The communication node is a first D2D UE.

The first D2D UE includes:

a first receiving unit, configured to receive bearer control information sent by a first eNB; and a change unit, configured to change to a second access node according to the bearer control information for communication data transmission, wherein the first eNB is a first access node or the second access node, and the second access node is the first eNB or a D2D relay node.

Alternatively, the bearer control information includes a bearer change indicator or bearer handover decision parameter information, wherein the bearer change indicator is used to indicate change of the first D2D UE to the second access node for communication data transmission; and the bearer handover decision parameter information is used for the first D2D UE to determine whether to be changeable to the second access node for communication data transmission.

Alternatively, the communication node further includes:

a first measurement unit, configured to measure at least one of a serving cell, a neighbor cell, a first relay node connected to the first D2D UE and a second relay node, so as to form a measurement result, wherein the second relay node is a relay node distant from the first relay node within a specified range; and a determination unit, configured to compare the measurement result with the bearer handover decision parameter information to determine whether to be changeable to the second access node for communication data transmission.

16. The communication node according to claim 13, wherein the first D2D UE further includes:

a first sending unit, configured to send bearer handover decision auxiliary information to the first eNB.

According to a fourth aspect of the embodiments of the disclosure, a communication node is provided. The communication node includes:

a forming unit, configured to form bearer control information; and a second sending unit, configured to send the bearer control information to a first D2D UE, wherein the bearer control information is used to change the first D2D UE to a second access node for communication data transmission;

a first eNB is a first access node or the second access node; and the second access node is the first eNB or a D2D relay node.

Alternatively, the bearer control information includes a bearer change indicator or bearer handover decision parameter information, wherein the bearer change indicator is used to indicate change of the first D2D UE to the second access node for communication data transmission; and the bearer handover decision parameter information is used for the first D2D UE to determine whether to be changeable to the second access node for communication data transmission.

Alternatively, the communication node further includes:

a second receiving unit, configured to receive bearer handover decision auxiliary information sent by the first D2D UE, wherein the forming unit is configured to form the bearer control information according to the bearer handover decision auxiliary information.

According to a fifth aspect of the embodiments of the disclosure, a computer storage medium is also provided. The computer storage medium stores computer-executable instructions, wherein the computer-executable instructions are used to execute at least one of the foregoing methods.

According to the information processing method and the communication node in the embodiments of the disclosure, when a node of a first D2D UE is changed or the first D2D UE is connected with multiple access nodes at the same time, demands for bearer change exist with the movement of the first D2D UE. In the method of the present embodiment, bearer control information is sent through a first eNB, and bearer handover for the D2D UE can be achieved in time, so as to maintain the continuity of data transmission.

DETAILED DESCRIPTION

It has been found that the phenomenon of discontinuous service transmission will happen when the existing D2D UEs are used. This phenomenon of discontinuous service data transmission is the result that the D2D UE may be located at a coverage edge location of a certain access node; and in this case, due to the bad signal transmission quality in a coverage edge, the foregoing phenomenon of discontinuous service data transmission easily happens. In view of this, an information processing method, a communication node and a storage medium are provided in the present application. A D2D UE is changed to other access nodes for communication data transmission though the control of bearer control information, such that the phenomenon of discontinuous data transmission can be solved.

The technical solutions of the disclosure will be further elaborated below with reference to the drawings of the specification and specific embodiments. It will be appreciated that the preferable embodiments illustrated below are only used to illustrate and explain the disclosure and do not limit the disclosure.

Method Embodiment 1

Figure 7:
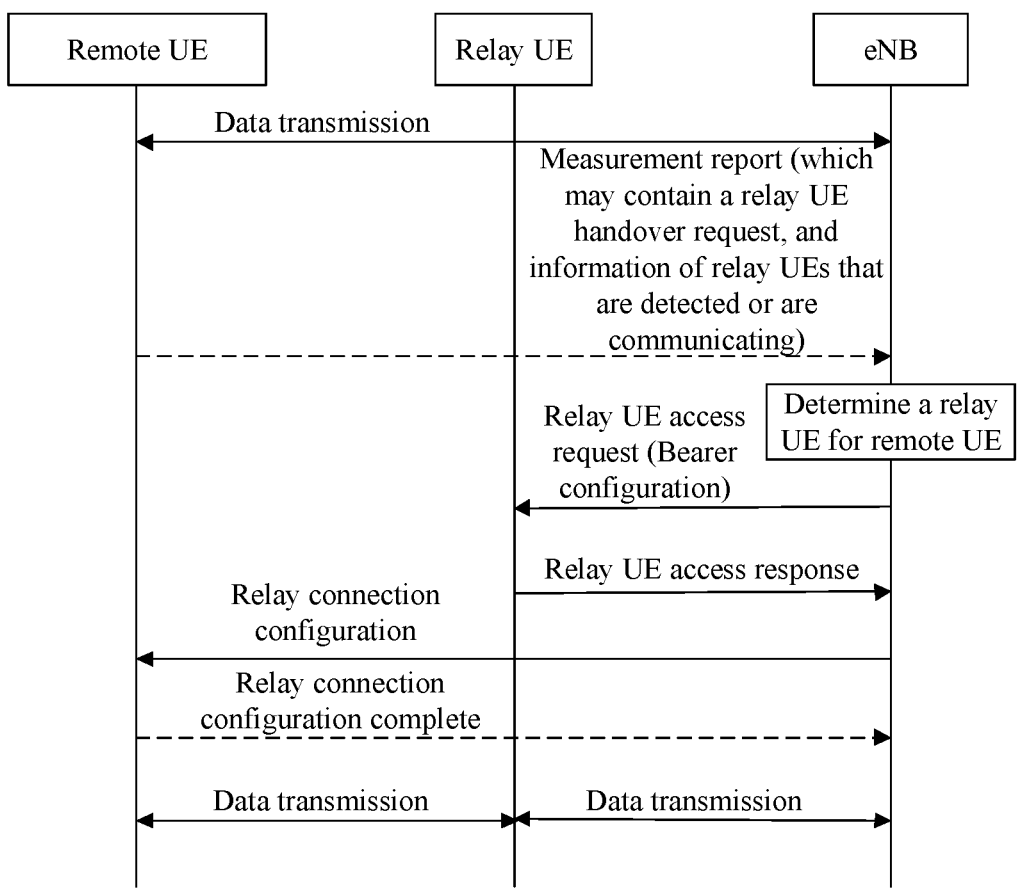
FIG. 7 is a second diagram of an information processing method according to an example of the disclosure.

As shown in FIG. 7, the present embodiment provides an information processing method. The method includes the steps as follows.

In step S310, bearer control information sent by a first eNB is received.

In step S320, a first D2D UE is changed to a second access node according to the bearer control information for communication data transmission;

wherein the first eNB is a first access node or the second access node, and the second access node is the first eNB or a D2D relay node.

After the first D2D UE accesses two access nodes or changes an access node, the first D2D UE has demands for bearer handover during communication. So, the present embodiment provides an information processing method of changing to a second access node for data transmission, which has the advantage of simple and convenient implementation.

When the first eNB is a first access node, the second access node may be a D2D relay node, and the D2D relay node may be a second D2D UE. When the first eNB is a second access node, and the first access node may be a D2D relay node. The second D2D UE is a UE different from the first D2D UE.

The bearer control information includes a bearer change indicator or bearer handover decision parameter information.

The bearer change indicator is directly used to indicate that the first D2D UE is changed to the second access node for communication data transmission.

The bearer handover decision parameter information is used to determine whether the first D2D UE is allowed to be changed to the second access node for communication data transmission.

The bearer handover decision parameter information includes at least one of RRM measurement threshold values of the first D2D UE for a serving cell and a neighbor cell, and measurement threshold values of signals sent by a first relay node and a second relay node. The second relay node is a relay node distant from the first relay node within a specified range, and the first relay node is a D2D relay node connected to the first D2D UE. The second relay node is a D2D relay node not connected to the first D2D UE.

The bearer change indicator is used to indicate that the first D2D UE is changed to a first eNB or a relay node for communication data transmission. At this time, the first eNB can determine, according to an own load or a current load of the relay node and a communication quality manner of a channel between the first eNB and the first D2D UE, whether to allow the first D2D UE to access the first eNB after receiving a bearer handover request sent by the first D2D UE. If so, the first eNB will send the bearer change indicator to the first D2D UE, so that the first D2D UE will receive the bearer change indicator. Otherwise, the first D2D UE may directly receive a message indicative of failure of the bearer change request from the first eNB. In this manner, the first eNB determines that the first D2D UE is allowed to be switched to network access through the first eNB.

The bearer control information includes bearer handover decision parameter information. The bearer handover decision parameter information includes at least one of an RRM measurement threshold value and a measurement threshold value for D2D communication. Thus, after measuring a reference signal and other signals sent by the first eNB and performing a decision according to the measurement threshold value, the first D2D UE can determine whether to be changeable to the second access node for communication data transmission. Obviously, in the present manner, it is determined whether to be changeable to the second access node for communication data transmission.

If the first eNB sends the bearer change indicator, the first eNB will also determine whether to allow the first D2D UE to be changed to the second access node for the bearer handover.

After receiving the bearer handover decision parameter information, the first D2D UE will determine whether to be able to switch the bearer to a second access node. Specifically for example, the first D2D UE will measure a serving cell and/or a neighbor cell and/or a first relay node and a second relay node, so as to form a measurement result, wherein the second relay node is a relay node distant from the first relay node within a specified range; and the first relay node is a D2D relay node connected to the first D2D UE, and the second relay node is a D2D relay node not connected to the first D2D UE. The first D2D UE compares the measurement result with the bearer decision information to determine whether to be changeable to the second access node for communication data transmission.

Specifically, the comparison may refer to the following examples.

It is determined that an eNB transmits cellular communication data when a measurement result of the first D2D UE for a serving cell and/or a neighbor cell and/or a D2D relay node satisfies the following conditions:

the bearer handover decision parameter information received by UE contains a Reference Signal Received Power (RSRP) threshold value of a serving cell, and an RSRP measurement value of the serving cell is higher than the threshold value;

and/or, the bearer handover decision parameter information received by the first D2D UE contains an RSRP threshold value of a neighbor cell, and an RSRP measurement value of the neighbor cell is higher than the threshold value;

and/or, the bearer handover decision parameter information received by the first D2D UE contains a signal intensity threshold value of a D2D relay node, and a signal quality measurement value of the D2D relay node is lower than the threshold value.

Before step S320 is executed, the method further includes: sending bearer handover decision auxiliary information to the first eNB.

The bearer handover decision auxiliary information in the present embodiment may be used to provide bases for forming the bearer control information by the first eNB. Specifically for example, a basis is provided for the first eNB to determine whether to send a bearer handover indicator or a bearer handover request failure to the first D2D UE, or for example, a basis is provided for the first eNB to determine an RRM measurement threshold value and a measurement threshold value of D2D communication, such that the first eNB controls access of the first D2D UE.

The bearer handover decision auxiliary information further includes at least one of the following: UE to NW relay indication information, a measurement report, and location information; and location information. The UE to NW relay indication information is used to indicate that the first D2D UE performs data transmission currently through a UE to NW relay; the measurement report contains an RRM measurement result of the first D2D UE for a current serving cell and/or neighbor cell; and the location information includes current geographical location information of the first D2D UE. These pieces of information can assist the first eNB in determining contents of a response message. Specifically for example, the current location of the first D2D UE is at the edge of a cell under the first eNB, and if the first D2D UE is directly changed to the first eNB for communication data transmission, it may cause the problem of poor communication effect. At this time, the first eNB can form a response message for keeping the first D2D UE from being changed to the first eNB to access a network according to the location information, or increase the foregoing RRM measurement threshold value.

If the first D2D UE needs to send a measurement report to the first eNB, the method further includes: before sending a measurement report to the first eNB, the first D2D UE receives measurement reporting configuration information sent by the first eNB, performs channel measurement according to the measurement reporting configuration information to form the measurement result, and sends the measurement report to the first eNB when the measurement result satisfies a reporting condition.

The measurement result herein satisfies the reporting condition in the following case: specifically for example, it finds from channel measurement that a signal sent by the first eNB reaches a signal intensity threshold value of the first D2D UE. However, the reporting condition is not limited to this.

Details of the parameter in the present embodiment may refer to description corresponding to Method Embodiment 1, and will not be repeated herein.

Method Embodiment 2

Figure 1:
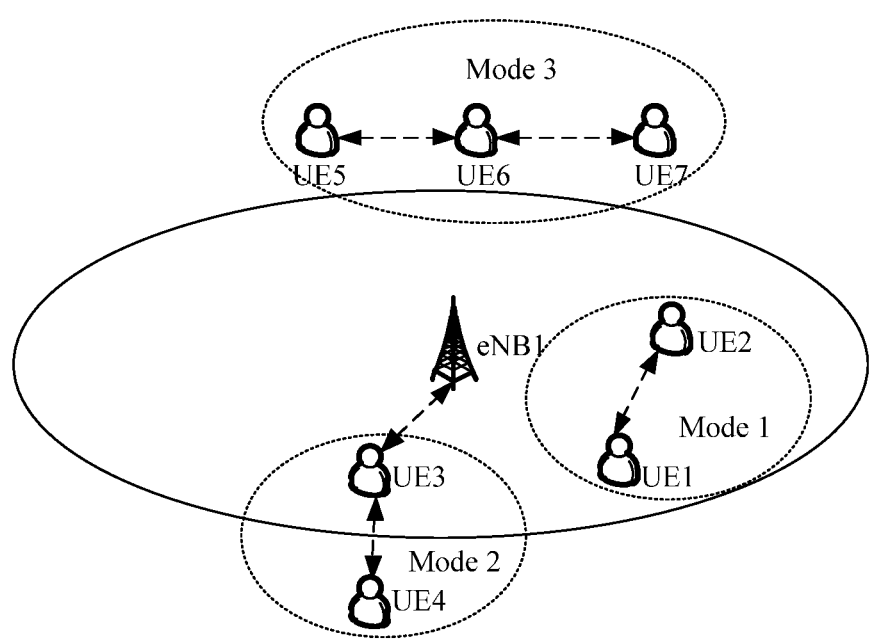
FIG. 1 is a first scenario diagram of D2D communications.
Figure 2:
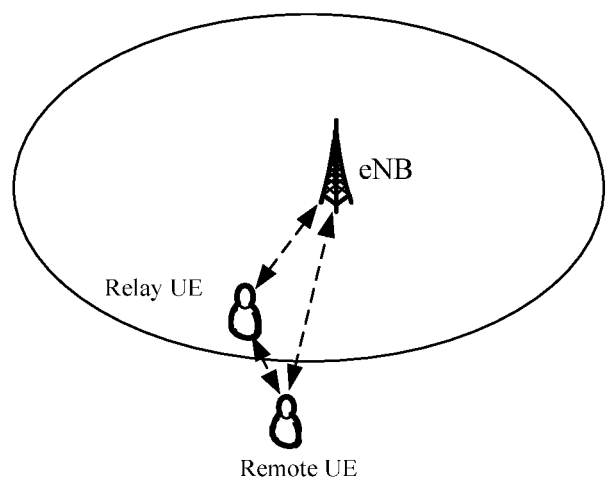
FIG. 2 is a second scenario diagram of D2D communications.
Figure 3:
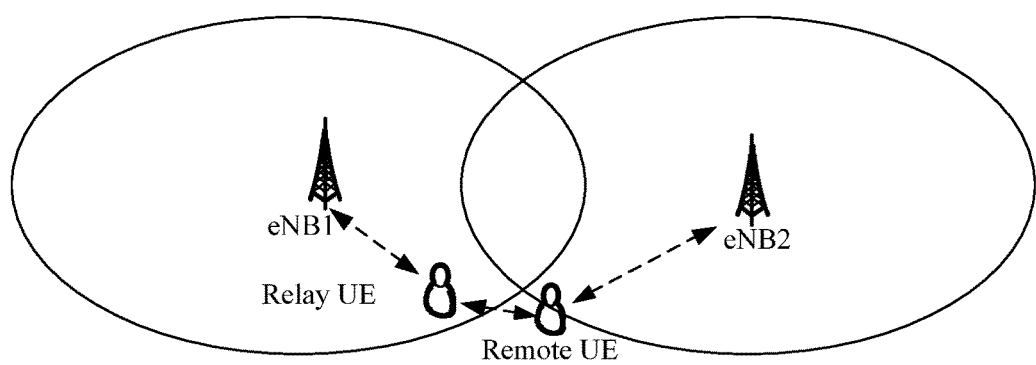
FIG. 3 is a third scenario diagram of D2D communications.
Figure 4:
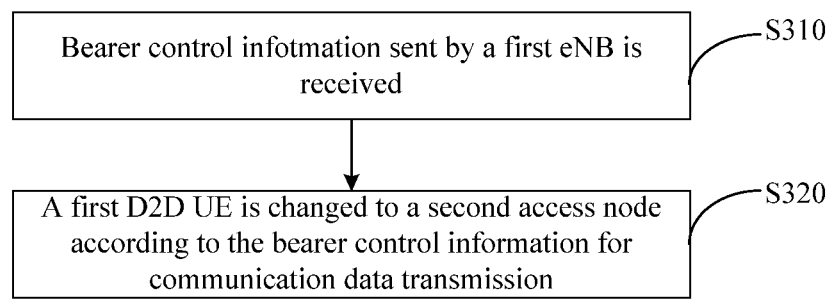
FIG. 4 is a first flowchart of an information processing method according to an embodiment of the disclosure.
Figure 5:
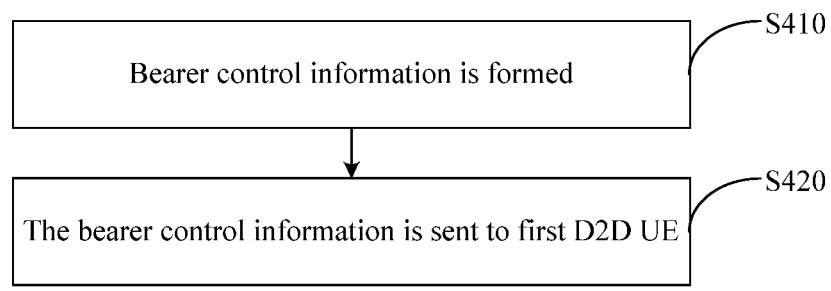
FIG. 5 is a second flowchart of an information processing method according to an embodiment of the disclosure.

As shown in FIG. 5, the present embodiment provides an information processing method. The method includes the steps as follows.

In step S410, bearer control information is formed.

In step S420, the bearer control information is sent to a first D2D UE.

Herein, the bearer control information is used to change the first D2D UE to a second access node for communication data transmission.

Herein, the first eNB is a first access node or the second access node.

The second access node is the first eNB or a D2D relay node.

The present embodiment provides an information processing method corresponding to Method Embodiment 1. The information processing method in the present embodiment is mainly applied to an access node, specifically to an eNB.

The first eNB may send the bearer control information in a broadcast or unicast manner. The bearer control information may be carried in cell information and sent in the broadcast or unicast manner, or carried in dedicated random access resource information and sent in the unicast manner. The bearer control information may include a bearer change indicator. The bearer change indicator is used to indicate that the first D2D UE is changed to the second access node for communication data transmission.

The bearer control information may include bearer handover decision parameter information. The bearer handover decision parameter information is used to determine whether the first D2D UE is allowed to be changed to the second access node for communication data transmission.

The bearer handover decision parameter information includes at least one of RRM measurement threshold values of the first D2D UE for a serving cell and a neighbor cell, and measurement threshold values of the first D2D UE for signals sent by a first relay node and a second relay node. The second relay node is a relay node distant from the first relay node within a specified range; and the first relay node is a D2D relay node connected to the first D2D UE, and the second relay node is a D2D relay node not connected to the first D2D UE.

The method in the present embodiment further includes: receiving bearer handover decision auxiliary information sent by the first D2D UE. Step S410 may include: forming the bearer control information according to the bearer handover decision auxiliary information.

Thus, the communication node may form the bearer control information according to the bearer handover decision auxiliary information sent by the first D2D UE.

The bearer handover decision auxiliary information further includes at least one of the following:

UE to NW relay indication information, a measurement report, and location information;

the UE to NW relay indication information is used to indicate that the first D2D UE performs data transmission currently through a UE to NW relay;

the measurement report contains an RRM measurement result of the first D2D UE for a current serving cell and/or neighbor cell, and/or a measurement result of the UE for signals sent by a first access node and/or a first relay node and/or a second relay node; the second relay node is a relay node distant from the first relay node within a specified range; the first relay node is a D2D relay node connected to the first D2D UE, and the second relay node is a D2D relay node not connected to the first D2D UE; and the location information includes current geographical location information of the first D2D UE.

These pieces of information can provide assistance for forming the bearer control information by the first eNB.

Specifically, for example, the measurement report is a measurement report reported when the measurement result satisfies a reporting condition.

Details of the parameter in the present embodiment may refer to description corresponding to Method Embodiment 1, and will not be repeated herein. Two specific examples are provided hereinbelow with reference to any one of the above embodiments.

EXAMPLE 1

Figure 6:
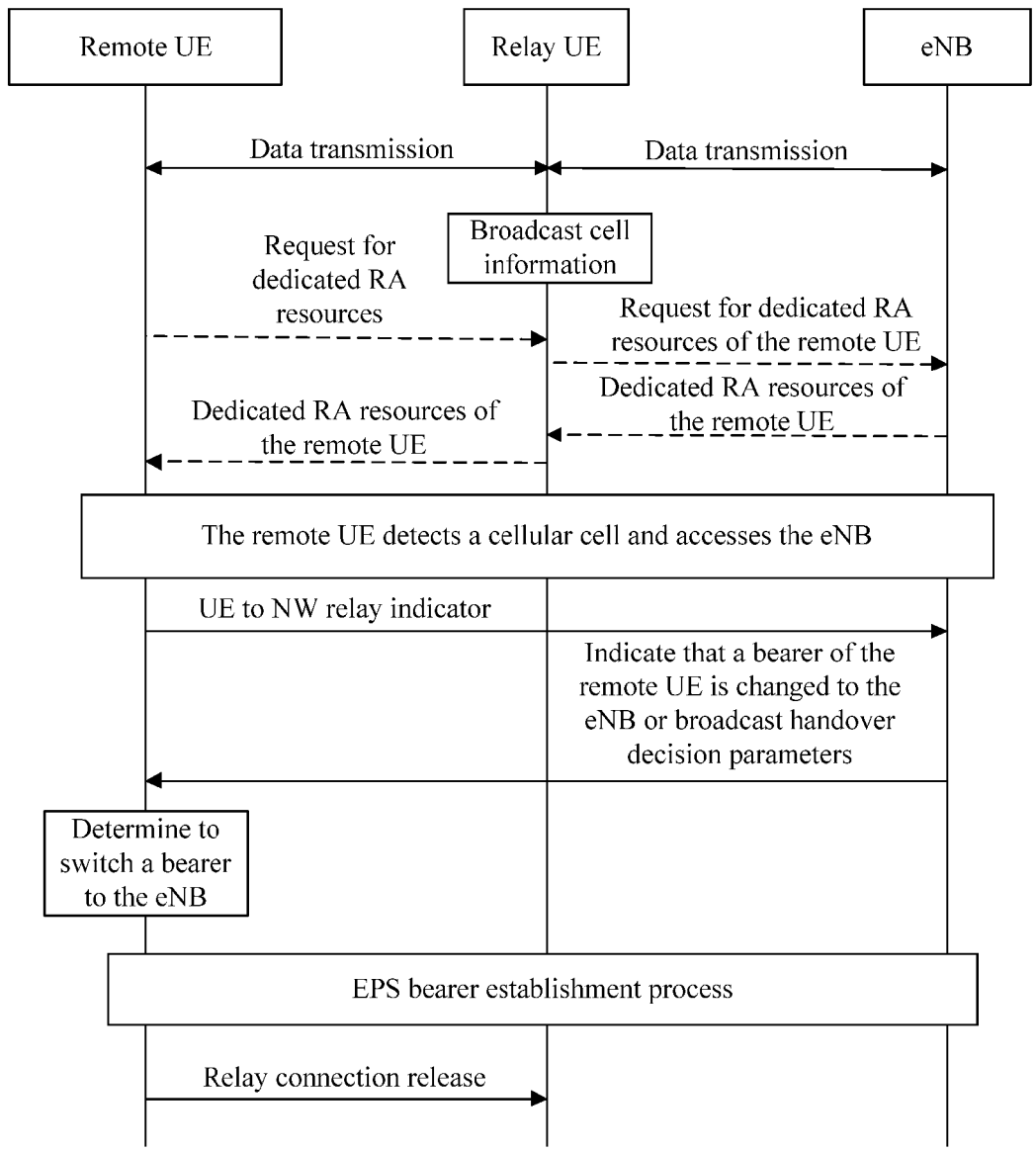
FIG. 6 is a first diagram of an information processing method according to an example of the disclosure.

The present example describes a method of changing to access the network through an eNB after a remote UE of a relay UE moves to a coverage range of the eNB. FIG. 6 is a flowchart of the method in the present example. The method in the present embodiment includes the steps as follows.

In step 401, in a current scenario, the remote UE performs data transmission with the eNB via the relay UE, and the relay UE may send auxiliary information in a broadcast manner so as to assist the remote UE in detecting a neighbor cell more quickly. For example, the auxiliary information is information of a cell where the relay UE is located or information of a neighbor cell or a proximal cell. The cell information may include one or any combination of the following: frequency point, a cell identifier, a cell access barring indicator, and a cell access probability parameter.

The cell access barring indicator is used to indicate that access to the cell is barred, for example, in case of heavy load of the cell. The cell access probability parameter may also be used to control the number of UE accessing the cell. For example, the value range of the cell access probability parameter is 0-1, the remote UE may select a random number within a range of 0 to 1, if the random number is smaller than the cell access probability parameter, the remote UE is allowed to access the cell, and otherwise, the remote UE is barred to access the cell.

The relay UE may learn of a load situation of the serving cell and/or the neighbor cell according to an Access Class Barring (ACB) parameter value broadcast in a System Information Block (SIB) of the serving cell and/or the neighbor cell. In addition, in view of load balancing, the relay UE may only broadcast information of a light-load cell/neighbor cell to the remote UE. For example, if the load of a cell where the relay UE is located is heavy (the relay UE may perform a decision according to an AC parameter), access barring of the cell where the relay UE is located may be indicated or a broadcast access probability parameter is broadcast, or frequency point/Physical Cell Identifier (PCI) information of the cell where the relay UE is located is not broadcast, so as to avoid from the UE detection and attempting to access the cell where the relay UE is located.

Besides, in addition to a manner of broadcasting via the relay UE, the auxiliary information may also be obtained in response to the request actively sent by the remote UE to the relay UE. For example, when the remote UE detects that it is entering a coverage range of a cellular cell, the relay UE is requested for auxiliary information.

In step 402, if the remote UE is desired to execute a non-contention RA process, the relay UE can be requested for dedicated RA resources. The dedicated RA resources include a dedicated random access preamble, and dedicated time and frequency domain resources.

In step 403, alternatively, after receiving a dedicated RA resource request, the relay UE may request an eNB for dedicated RA resources for the remote UE.

In step 404, if the eNB receives the dedicated RA resource request, the dedicated RA resources for the remote UE can be sent to the relay UE.

In step 405, after receiving the dedicated RA resources allocated for the remote UE by the eNB, the relay UE sends the dedicated resources to the remote UE.

In step 406, the remote UE detects an available cellular cell according to the auxiliary information and/or the dedicated RA resources received from the relay UE, and access the cell. Specifically, for example, the remote UE in FIG. 8 detects the cellular cell and accesses the eNB.

In step 407, alternatively, the remote UE may send a UE to NW relay indicator to the accessed eNB, the indicator being used to indicate that the remote UE is accessing the network via a UE to NW relay of the relay UE. Alternatively, the remote UE may also inform the eNB of information of the accessed relay UE (such as identifier) and location information of the remote UE. Alternatively, the remote UE may report a measurement result for the relay UE and the serving cell/neighbor cell to the eNB. Before sending the measurement report to the eNB, the remote UE may receive measurement reporting configuration information sent by the eNB, and report the measurement result to the eNB according to the measurement reporting configuration information when a measurement reporting condition is satisfied. Alternatively, the remote UE may send a bearer handover request to the eNB, and request to convert into an access via the eNB for communication data transmission. A UE to NW relay indicator in FIG. 7 is the foregoing UE to NW relay indicator.

In step 408, if the eNB determines that the remote UE can switch a bearer to the eNB, i.e., the eNB accesses the network to perform communication data transmission, a bearer handover indicator is sent to the UE for indicating that the UE converts D2D relay node-based communication data transmission into eNB-based communication data transmission.

In step 409, or, the eNB may broadcast bearer handover decision parameter information used for the remote UE to determine whether to execute bearer handover, i.e., converting the communication data transmission accessed through a relay UE into the communication data transmission accessed through the eNB. The bearer handover decision parameter information includes one or combination of the following: an RRM measurement threshold value of UE for a serving cell and/or a neighbor cell; and a measurement threshold value of D2D communication between UE and a D2D relay node.

Note: the step may replace step 407 and step 408. That is, if the eNB broadcasts a handover decision parameter, the UE does not need to report a UE to NW relay indicator to the eNB, the eNB does not need to execute the bearer handover decision and send a bearer handover indicator to the UE, but the UE self-determines whether to transmit data through the eNB instead.

In step 410, if receiving the bearer handover indicator, the remote UE determines to transmit cellular communication data through the eNB, and initiates an Evolved Packet System (EPS) bearer establishment process. Alternatively, the remote UE may send a relay connection release message to the relay UE so as to inform the relay UE; or, the relay UE may release a connection with the remote UE after activation of a timer (started/restarted when receiving or sending D2D data to the remote UE) expires. Or, if the remote UE receives the bearer handover decision parameter information, the UE self-determines whether the eNB transmits cellular communication data according to a measurement result for a serving cell and/or a neighbor cell and/or a D2D relay node. If the measurement result satisfies a predefined criterion, it is determined that the eNB transmits the cellular communication data, and the EPS bearer establishment process is initiated. Alternatively, the remote UE may send a relay connection release message to the relay UE so as to inform the relay UE; or, the relay UE may release a connection with the remote UE after activation of a timer (started/restarted when receiving or sending D2D data to the remote UE) expires.

Example 2

Figure 8:
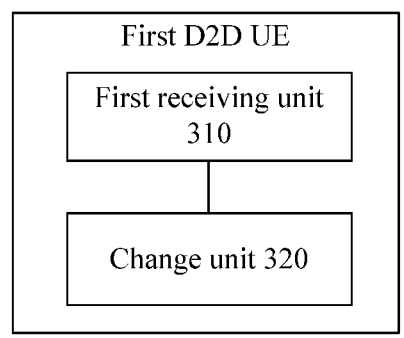
FIG. 8 is a structure diagram of a first D2D UE according to an embodiment of the disclosure.
Figure 9:
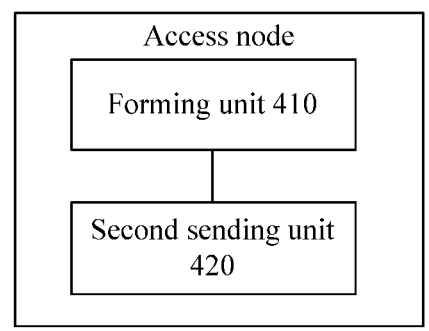
FIG. 9 is a structure diagram of an access node according to an embodiment of the disclosure.

The present embodiment describes a method of changing to network access through a UE to NW relay of a relay UE after a UE accessed through an eNB moves out of a coverage range of the eNB. FIG. 8 is a flowchart of the method in the present example. As shown in FIG. 7, the method in the present embodiment includes the steps as follows.

In step 501, a UE accesses a network through an eNB and transmits data. In a process of moving the UE out of a coverage range of a cellular cell, the UE may send a relay node access request indicator to the eNB, so as to request the eNB for converting into a communication manner of accessing through a D2D relay node. Alternatively, the UE may also report an identifier of the D2D relay node accessed by the UE or D2D relay node information (such as identification information) detected by the UE to the eNB. Alternatively, the UE may report current location information thereof, or measurement results for the accessed relay UE, a serving cell and a neighbor cell to the eNB.

In step 502, the eNB determines that it is necessary to convert into an access network through a UE to NW relay of a relay UE for the UE, and selects one relay UE for the UE. Alternatively, the eNB may execute a decision according to the information reported by the UE and select the relay UE. As mentioned in step 501, the information reported by the UE may include one or combination of the following: a relay node access request indicator, an identifier of a D2D relay node accessed by the UE or D2D relay node information (such as identification information) detected by the UE, current location information of the UE, or measurement results of the UE for the accessed relay UE, a serving cell and a neighbor cell.

In step 503, the eNB sends a relay access request message to the selected D2D relay node. The relay access request message may contain: identification information of a remote UE, communication service QoS demand information of the remote UE, D2D security capability information, D2D security relevant parameter information, D2D communication group identification information of the remote UE, a D2D relay type (i.e., a UE to NW relay) requested by the remote UE, priority information of the remote UE, priority information of a D2D communication group where the remote UE is located, priority information of a D2D communication service of the remote UE, and configuration information of D2D communication between the remote UE and the relay UE. Herein, the communication service QoS demand information of the remote UE may contain information such as a QoS Class Identifier (QCI), an Allocation and Retention Priority (ARP), whether to be a Guaranteed Bit Rate (GBR), and a Maximum Bit Rate (MBR). Herein, the configuration information of the D2D communication between the remote UE and the relay UE may contain D2D communication bearer configuration information, security relevant configuration information and the like. QoS is an abbreviation for quality of service.

In step 504, after receiving the relay access request message, the relay UE needs to execute admission control and determine whether to allow the remote UE to access the network through a relay of the relay UE. Specifically, the relay UE may determine whether to allow access of D2D UE1 according to an own relay capability, transmitting and receiving capabilities, the number of D2D UEs already accessed, priority information, and communication service QoS demand information of D2D UEs.

In step 505, if the relay UE allows access of the remote UE, a relay access response message is sent to the eNB. The relay access response message may contain: identification information of the remote UE, and configuration information of D2D communication between the remote UE and the relay UE. Herein, the configuration information of the D2D communication between the remote UE and the relay UE may contain D2D communication bearer configuration information, security relevant configuration information and the like. If the relay UE does not allow access of the remote UE, a refusal message is returned to the eNB, and the eNB may select other candidate relay UEs for the remote UE.

In step 506, after receiving the relay access response message, the eNB sends access node change information to the remote UE so as to command the remote UE to access the relay UE. The access node change information may contain: information of a D2D relay node to be accessed, D2D communication resource information available for D2D communication between the remote UE and the relay UE, D2D communication bearer configuration information of D2D communication between the remote UE and the relay UE, and a bearer handover indicator. Specifically, the configuration information of the D2D communication between the remote UE and the relay UE may contain D2D communication bearer configuration information, security relevant configuration information and the like. The bearer handover indicator is used to indicate whether the UE converts eNB-based communication data transmission into relay UE-based communication data transmission.

In step 507, if the remote UE confirms to access the network through the relay of the relay UE to perform cellular communication, a confirmation message is sent to the eNB. Then, the remote UE may perform cellular communication through data forwarding of the relay UE.

It is important to note that both the eNBs in Example 1 and Example 2 may be the foregoing first eNB, and the relay UE is the second D2D UE in the foregoing embodiments. The remote UE is the remote UE in the foregoing embodiments.

Equipment Embodiment 1

As shown in FIG. 13, the present embodiment provides a communication node. The communication node is a first D2D UE.

The first D2D UE includes:

a first receiving unit 310, configured to receive bearer control information sent by a first eNB; and a change unit 320, configured to change to a second access node according to the bearer control information for communication data transmission, wherein the first eNB is a first access node or the second access node, and the second access node is the first eNB or a D2D relay node.

A specific structure of the first receiving unit in the present embodiment may include an antenna and other structures, such as one or more receiving antennae located in the first D2D UE.

A specific structure of the change unit 320 may be various types of processors or processing chips with an information forming function, specifically, such as an Application Processor (AP), a Central Processing Unit (CPU), a Micro Control Unit (MCU), a Digital Signal Processor (DSP), a Programmable Logic Controller (PLC) and other structures.

The communication node in the present embodiment is a D2D UE, capable of switching a bearer so as to ensure the continuity of communication transmission, and providing implementation hardware for the information processing method in Method Embodiment 1.

The bearer control information includes a bearer change indicator or bearer handover decision parameter information.

The bearer change indicator is used to indicate that the first D2D UE is changed to the second access node for communication data transmission; and the bearer handover decision parameter information is used to determine whether the first D2D UE is allowed to be changed to the second access node for communication data transmission.

Herein, the bearer handover decision parameter information includes at least one of RRM measurement threshold values of the first D2D UE for a serving cell and a neighbor cell, and measurement threshold values of signals sent by a first relay node and a second relay node. The second relay node is a relay node distant from the first relay node within a specified range; and the first relay node is a D2D relay node connected to the first D2D UE, and the second relay node is a D2D relay node not connected to the first D2D UE. The communication node further includes:

a first measurement unit, configured to measure at least one of a serving cell, a neighbor cell, a first relay node and a second relay node connected to the first D2D UE, so as to form a measurement result, wherein the second relay node is a relay node distant from the first relay node within a specified range; and a determination unit, configured to compare the measurement result with the bearer handover decision parameter information to determine whether to be changeable to the second access node for communication data transmission.

A specific structure of the first measurement unit may include communication interfaces capable of receiving signals sent by the serving cell, the neighbor cell, the first relay node connected to the first D2D UE and the second relay node, and demodulation devices for demodulating the signals and determining the signal intensity, and the like. Thus, the measurement result can be simply and conveniently obtained.

A specific structure of the determination unit may include various types of processors.

The first D2D UE further includes:

a first sending unit, configured to send bearer handover decision auxiliary information to the first eNB.

A specific structure of the sending unit may include one or more sending antennae, capable of sending the bearer handover decision auxiliary information.

The bearer handover decision auxiliary information further includes at least one of the following:

UE to NW relay indication information, a measurement report, and location information;

the UE to NW relay indication information is used to indicate that the first D2D UE performs data transmission currently through a UE to NW relay;

the measurement report contains an RRM measurement result of the first D2D UE for a current serving cell and/or neighbor cell and/or a measurement result of the UE for a signal sent by a first access node; and the location information includes current geographical location information of the first D2D UE.

The first receiving unit is further configured to receive, before the first D2D UE sends a measurement report to the first eNB, measurement reporting configuration information sent by the first eNB.

The first D2D UE further includes:

a second measurement unit, configured to perform channel measurement according to the measurement reporting configuration information to form the measurement result.

The first sending unit is configured to send, when the measurement result satisfies a reporting condition, the measurement report to the first eNB.

A specific structure of the second measurement unit may be similar to the structure of the first measurement unit.

Relevant description of various pieces of information in the present embodiment may refer to the description corresponding to Method Embodiment 1, and will not be repeated herein.

Equipment Embodiment 4

As shown in FIG. 8, the present embodiment provides a communication node. The communication node includes:

a forming unit 410, configured to form bearer control information; and a second sending unit 420, configured to send the bearer control information to a first D2D UE, wherein the bearer control information is used to change the first D2D UE to a second access node for communication data transmission;

wherein a first eNB is a first access node or the second access node; and the first access node and the second access node belong to different types of access nodes.

A specific structure of the forming unit 410 in the present embodiment may be various types of processors or processing chips with an information forming function, specifically, such as an AP, a CPU, an MCU, a DSP, a PLC and other structures.

A specific structure of the second sending unit 420 may include one or more sending antennae.

The bearer control information includes a bearer change indicator or bearer handover decision parameter information.

The bearer change indicator is used to indicate that the first D2D UE is changed to the second access node for communication data transmission.

The bearer handover decision parameter information is used to determine whether the first D2D UE is allowed to be changed to the second access node for communication data transmission.

The bearer handover decision parameter information includes at least one of RRM measurement threshold values of the first D2D UE for a serving cell and a neighbor cell, and measurement threshold values of the first D2D UE for signals sent by a first relay node and a second relay node. The second relay node is a relay node distant from the first relay node within a specified range; and the first relay node is a D2D relay node connected to the first D2D UE, and the second relay node is a D2D relay node not connected to the first D2D UE.

The communication node further includes:

a second receiving unit, configured to receive bearer handover decision auxiliary information sent by the first D2D UE, wherein the forming unit 410 is configured to form the bearer control information according to the bearer handover decision auxiliary information.

The second receiving unit may be a receiving antenna on the access node. In a word, the communication node in the present embodiment is a D2D UE, capable of switching a bearer to ensure the continuity of communication transmission, and providing implementation hardware for the information processing method in Method Embodiment 2. Relevant description of various pieces of information in the present embodiment may refer to the description corresponding to Method Embodiment 1, and will not be repeated herein. Usually, the communication node in the present embodiment is an eNB.

The bearer handover decision auxiliary information further includes at least one of the following:

UE to NW relay indication information, a measurement report, and location information;

the UE to NW relay indication information is used to indicate that the first D2D UE performs data transmission currently through a UE to NW relay;

the measurement report contains an RRM measurement result of the first D2D UE about a current serving cell and/or neighbor cell and/or a measurement result of the UE for signals sent by a first access node; and the location information includes current geographical location information of the first D2D UE.

The measurement report is reported when the measurement result satisfies the reporting condition.

In the communication node of the present embodiment, any two receiving units and/or sending units on the same communication node may correspond to communication interfaces with transmitting and receiving functions at the same time, specifically, such as a transmitting and receiving antenna.

The embodiment of the disclosure also provides a computer storage medium. The computer storage medium stores a computer-executable instruction, wherein the computer-executable instruction is used to execute at least one of the foregoing methods such as at least one of the methods illustrated in FIG. 4, FIG. 5, FIG. 6 and FIG. 7.

The computer storage medium may be various media capable of storing program codes, such as mobile storage equipment, a Read-Only Memory (ROM), a Random Access Memory (RAM), a magnetic disk or an optical disk, and optionally, the computer storage medium is a non-transitory storage medium.

The above is only detailed description of the disclosure, but the protection scope of the disclosure is not limited to this. Modifications made according to the principle of the disclosure shall be interpreted as falling within the scope of protection of the disclosure.

INDUSTRIAL APPLICABILITY

In the embodiments of the disclosure, a D2D UE is controlled to be changed to other access nodes according to bearer control information for communication data transmission, thus reducing the interruption of service data transmission in a communication process of the D2D UE, and improving the continuity of the communication data transmission of the D2D UE.

The invention claimed is:

1. An information processing method, comprising:

receiving, by a first Device-to-Device User Equipment (D2D UE), bearer control information sent by a first evolved Node B (eNB), wherein the bearer control information comprises bearer handover decision parameter information used to determine whether the first D2D UE is allowed to be changed to a second access node for communication data transmission; and changing, by the first D2D UE, to the second access node according to the bearer control information for communication data transmission;

wherein the first eNB is a first access node, and the second access node is D2D relay node;

wherein changing, by the first D2D UE, to the second access node according to the bearer control information for communication data transmission comprises:

measuring, by the first D2D UE, signals sent by a serving cell to form a measurement result; and comparing the measurement result with the bearer handover decision parameter information to determine whether to change to the second access node for communication data transmission.

2. The method according to claim 1, wherein
the bearer control information further comprises a bearer change indicator,
the bearer change indicator being used to indicate that the first D2D UE is changed to the second access node for communication data transmission.

3. The method according to claim 1, wherein
the bearer handover decision parameter information comprises a Radio Resource Management (RRM) measurement threshold value of the first D2D UE for the serving cell.

4. The method according to claim 1, the method further comprising:
before changing, by the first D2D UE, to the second access node according to the bearer control information for communication data transmission,
sending bearer handover decision auxiliary information to the first eNB.

5. The method according to claim 4, wherein
the bearer handover decision auxiliary information comprises at least one of the following:
UE to Network (UE to NW) relay indication information, a measurement report, or location information;
the UE to NW relay indication information is used to indicate that the first D2D UE performs data transmission currently through a UE to NW relay;
the measurement report contains an RRM measurement result of the first D2D UE for the serving cell; and
the location information comprises current geographical location information of the first D2D UE.

6. The method according to claim 5, the method further comprising:
before the first D2D UE sends the measurement report to the first eNB, receiving measurement reporting configuration information sent by the first eNB;
performing measurement according to the measurement reporting configuration information to form the measurement result; and
when the measurement result satisfies a reporting condition, sending the measurement report to the first eNB.

7. An information processing method, comprising:
forming, by a first evolved Node B (eNB), bearer control information, wherein the bearer control information comprises bearer handover decision parameter information, the bearer handover decision parameter information being used by a first Device-to-Device User Equipment (D2D UE), to measure signals sent by a serving cell to form a measurement result and compare the measurement result with the bearer handover decision parameter information to determine whether to change the first D2D UE to a second access node for communication data transmission; and
sending, by the first eNB, the bearer control information to the first D2D UE,
wherein the first eNB is a first access node, and the second access node is a D2D relay node.

8. The method according to claim 7, wherein
the bearer control information further comprises a bearer change indicator,
the bearer change indicator being used to indicate that the first D2D UE is changed to the second access node for communication data transmission.

9. The method according to claim 7, wherein
the bearer handover decision parameter information comprises a Radio Resource Management (RRM) measurement threshold value of the first D2D UE for the serving cell.

10. The method according to claim 7, the method further comprising:
receiving bearer handover decision auxiliary information sent by the first D2D UE, wherein forming bearer control information comprises:
forming the bearer control information according to the bearer handover decision auxiliary information.

11. The method according to claim 10, wherein
the bearer handover decision auxiliary information comprises at least one of the following:
UE to Network (UE to NW) relay indication information, a measurement report, or location information;
the UE to NW relay indication information is used to indicate that the first D2D UE performs data transmission currently through a UE to NW relay;
the measurement report contains an RRM measurement result of the first D2D UE for the serving cell; and
the location information comprises current geographical location information of the first D2D UE.

12. A communication node, the communication node being a first Device-to-Device User Equipment (D2D UE), the first D2D UE comprising:
a processor; and
a memory for storing computer-readable instructions executable for the processor;
wherein when the computer-readable instructions are executed, the processor is configured to:
receive bearer control information sent by a first evolved Node B (eNB),
wherein the bearer control information comprises bearer handover decision parameter information used to determine whether the first D2D UE is allowed to be changed to a second access node for communication data transmission; and
change to the second access node according to the bearer control information for communication data transmission,
wherein the first eNB is a first access node, and the second access node is a D2D relay node;
wherein the processor is further configured to:
measure signals sent by a serving cell to form a measurement result;
and
compare the measurement result with the bearer handover decision parameter information to determine whether to change to the second access node for communication data transmission.

13. The communication node according to claim 12, wherein
the bearer control information further comprises a bearer change indicator,
the bearer change indicator being used to indicate that the first D2D UE is changed to the second access node for communication data transmission.

14. The communication node according to claim 12, wherein the processor is further configured to:
send bearer handover decision auxiliary information to the first eNB.

15. A communication node, comprising:
a processor; and
a memory for storing computer-readable instructions executable for the processor;
wherein when the computer-readable instructions are executed, the processor is configured to:
form bearer control information, wherein the bearer control information comprises bearer handover decision parameter information, the bearer handover decision parameter information being used by a first Device-to-Device User Equipment (D2D UE) to measure signals sent by a serving cell to form a measurement result and compare the measurement result with the bearer handover decision parameter information to determine whether to change the first D2D UE to a second access node for communication data transmission; and send the bearer control information to the first D2D UE, wherein a first evolved Node B (eNB) is a first access node, and the second access node is a D2D relay node.

16. The communication node according to claim 15, wherein the bearer control information further comprises a bearer change indicator, the bearer change indicator being used to indicate that the first D2D UE is changed to the second access node for communication data transmission.

17. The communication node according to claim 15, wherein the processor is further configured to:

receive bearer handover decision auxiliary information sent by the first D2D UE; and form the bearer control information according to the bearer handover decision auxiliary information.

* * * * *